United States Patent [19]

Braehler et al.

[11] Patent Number: 5,417,943
[45] Date of Patent: May 23, 1995

[54] METHOD FOR PRODUCING UO2 OR (U/PU)O2 POWDER

[75] Inventors: Georg Braehler, Somborn; Kurt Wittmann, Erlensee, both of Germany

[73] Assignee: Siemens Aktiengesellschaft, Munich, Germany

[21] Appl. No.: 125,552

[22] Filed: Sep. 22, 1993

[30] Foreign Application Priority Data

Sep. 22, 1992 [EP] European Pat. Off. .......... 92116198

[51] Int. Cl.$^6$ ............................................. C01F 13/00
[52] U.S. Cl. ........................................ 423/2; 423/261; 423/256; 252/638; 252/639; 204/157.2
[58] Field of Search ............. 423/2, 261, 256; 252/635; 639; 204/157.2

[56] References Cited

U.S. PATENT DOCUMENTS

| | | | |
|---|---|---|---|
| 2,896,930 | 7/1959 | Menke | 262/3 |
| 2,992,887 | 7/1961 | Thunaes et al. | 23/14.5 |
| 3,860,289 | 1/1975 | Learmont | 299/4 |
| 3,906,081 | 9/1975 | Welty | 423/261 |
| 3,908,757 | 9/1976 | Dokvzogvz | 423/253 |
| 3,963,828 | 6/1976 | Becker | 423/261 |
| 4,235,740 | 11/1980 | Druckenrodt et al. | 252/301.1 R |
| 4,292,279 | 9/1981 | Reusser | 423/15 |
| 4,528,130 | 7/1985 | Lederbrink et al. | 252/64.3 |
| 4,565,672 | 1/1986 | Schneider et al. | 423/15 |
| 4,871,479 | 10/1989 | Bachelard et al. | 252/636 |
| 4,985,183 | 1/1991 | Yato et al. | 264/0.5 |
| 5,139,709 | 8/1992 | Huana et al. | 264/0.5 |

FOREIGN PATENT DOCUMENTS 3200518 9/1982 Germany.
3506111 8/1985 Germany.

OTHER PUBLICATIONS

Nuclear Technology (1988) Jun., (Haas) pp. 393-406 "A Comparison of Processes for the Conversion of Uranyl".
Institution of Mining and Metallurgy 1980, pp. C145-152, "Hydrogen Peroxide Leaching of Uranium in Carbonate".
Colorado School of Mines Research Institute, Cherritt/99-103 "The Extractive Metallurgy of Uranium".
Questel Plus, 25/03/93, p. 1, "Uranium Dioxide Powder Prodn-" Search Report, Europe.

Primary Examiner—Donald P. Walsh
Assistant Examiner—Meena Chelliah
Attorney, Agent, or Firm—Herbert L. Lerner; Laurence A. Greenberg

[57] ABSTRACT

A method for producing $UO_2$ or $(U/Pu)O_2$ powder includes obtaining ammonium uranyl carbonate or ammonium uranyl plutonyl carbonate by treating a starting oxide selected from the group consisting of uranium oxide, plutonium oxide and uranium plutonium mixed oxide, with at least one solution selected from the group consisting of aqueous ammonium carbonate solution and aqueous ammonium hydrogen carbonate solution. The ammonium uranyl carbonate or ammonium uranyl plutonyl carbonate is then heated and in particular calcined.

8 Claims, No Drawings

METHOD FOR PRODUCING UO2 OR (U/PU)O2 POWDER

BACKGROUND OF THE INVENTION

FIELD OF THE INVENTION

The invention relates to a method for producing $UO_2$ or $(U/Pu)O_2$ powder.

It is known for sinterable $UO_2$ or $(U/Pu)O_2$ to be compressed in powder form to make green compacts, and to produce sintered compacts from the green compacts. Such sintered compacts are introduced as nuclear fuel into the cladding tubes of fuel rods. The fuel rods are assembled to make nuclear reactor fuel assemblies. The nuclear reactor fuel assemblies are finally disposed in the reactor core of a nuclear reactor, which as a rule is moderated by light water.

It is also already conventional to obtain sinterable $UO_2$ by heating ammonium uranyl carbonate. The ammonium uranyl carbonate is precipitated out of an aqueous solution of ammonium carbonate, into which gaseous uranium hexafluoride is introduced. Ammonium fluoride is produced as a further reaction product.

It is also already usual to convert uranium oxide, such as $UO_2$, $U_3O_8$, and $UO_3$, into ammonium uranyl carbonate and from the ammonium uranyl carbonate to obtain sinterable $UO_2$ powder by heating it. In that case as well, the ammonium uranyl carbonate is precipitated out in an aqueous ammonium carbonate solution. For that purpose, an aqueous uranyl nitrate solution is added to the aqueous ammonium carbonate solution, so that ammonium nitrate is produced as a byproduct. The aqueous uranyl nitrate solution in turn is obtained by dissolving the appropriate uranium oxide in nitric acid. That produces nitrous gases ($NO_x$) as byproducts.

The nitrous gases are poisonous and can therefore not be vented to the atmosphere, but must instead be converted into harmless substances, such as nitrogen, water, or nitric acid.

The ammonium nitrate that occurs as a byproduct in the precipitation of the ammonium uranyl carbonate out of the aqueous ammonium carbonate solution is explosive and therefore requires proper safety precautions. Although it can be processed into synthetic fertilizer, and can also be thermally decomposed into nitrogen and water, the latter provision is especially difficult and expensive, and further processing into synthetic fertilizer requires complete decontamination of the ammonium nitrate solution, which once again involves considerable expense.

SUMMARY OF THE INVENTION

It is accordingly an object of the invention to provide a method for producing $UO_2$ or $(U/Pu)O_2$ powder, which overcomes the hereinafore-mentioned disadvantages of the heretofore-known methods of this general type.

With the foregoing and other objects in view there is provided, in accordance with the invention, a method for producing $UO_2$ or $(U/Pu)O_2$ powder, which comprises obtaining ammonium uranyl carbonate or ammonium uranyl plutonyl carbonate by treating a starting oxide selected from the group consisting of uranium oxide, plutonium oxide and uranium plutonium mixed oxide, with at least one solution selected from the group consisting of aqueous ammonium carbonate solution and aqueous ammonium hydrogen carbonate solution; and heating the ammonium uranyl carbonate or ammonium uranyl plutonyl carbonate, in particular by calcining.

In accordance with another mode of the invention, there is provided a method which comprises dissolving the starting oxide in a solution, precipitating the ammonium uranyl carbonate or the ammonium uranyl plutonyl carbonate out of the solution, and filtering out the ammonium uranyl carbonate or the ammonium uranyl plutonyl carbonate.

In accordance with a further mode of the invention, there is provided a method which comprises obtaining the ammonium uranyl carbonate or the ammonium uranyl plutonyl carbonate by digestion of the starting oxide with the solution.

In accordance with an added mode of the invention, there is provided a method which comprises increasing an enrichment of uranium metal to U-235 by shining in laser light, and then oxidizing the uranium metal into the starting uranium oxide.

In accordance with an additional mode of the invention, there is provided a method which comprises treating sintered scrap as a starting oxide with the aqueous ammonium carbonate or ammonium hydrogen carbonate solution.

In accordance with yet another mode of the invention, there is provided a method which comprises compressing the $UO_2$ or $(U/Pu)O_2$ powder obtained by heating the ammonium uranyl carbonate or ammonium uranyl plutonyl carbonate into green compacts, and sintering the green compacts into sintered compacts.

In accordance with a concomitant mode of the invention, there is provided a method which comprises adding an oxidation agent for the starting oxide to the solution.

This method intended for producing $UO_2$ or $(U/Pu)O_2$ powder avoids byproducts in the form of either nitrous gases or ammonium nitrate and is therefore especially economical. This method is based on the recognition that ammonium uranyl carbonate or ammonium uranyl plutonyl carbonate can also be precipitated out of an aqueous ammonium carbonate solution or ammonium hydrogen carbonate solution to which a starting oxide, selected from the group of uranium oxide, plutonium oxide, and uranium-plutonium mixed oxide, is added directly. Nevertheless, by heating, sinterable $UO_2$ or $(U/Pu)O_2$ mixed oxide powder can be produced from the precipitated ammonium uranyl carbonate or ammonium uranyl plutonyl carbonate.

However, the treatment of the applicable starting oxide need not be merely precipitating the ammonium uranyl carbonate or ammonium uranyl plutonyl carbonate from the aqueous ammonium carbonate or ammonium hydrogen carbonate solution, for instance by supersaturating this solution with ammonium carbonate or ammonium hydrogen carbonate, or by cooling down the solution. This treatment can also be digesting the starting oxide with the aqueous ammonium carbonate or ammonium hydrogen carbonate solution. The applicable solid but powdered starting oxide is intimately mixed with a small enough amount of concentrated aqueous ammonium carbonate or ammonium hydrogen carbonate solution that the solubility product of ammonium uranyl carbonate or ammonium uranyl plutonyl carbonate is constantly exceeded. The solid starting oxide remains largely undissolved and is converted directly, practically in the solid state, into ammonium uranyl carbonate or ammonium uranyl plutonyl carbonate.

The mother liquor separated out from the ammonium uranyl carbonate or ammonium uranyl plutonyl carbonate includes aqueous ammonium carbonate solution or ammonium hydrogen carbonate solution and can be reused to dissolve starting oxide.

Other features which are considered as characteristic for the invention are set forth in the appended claims.

Although the invention is illustrated and described herein as embodied in a method for producing $UO_2$ or $(U/Pu)O_2$ powder, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying table.

TABLE

| No. | Starting mixture (ml) | U-Oxide | Concentration (g U/l) | Medium Ratio U:$CO_3^{2-}$ | Medium $H_2O_2$ (ml) | Dissolution temperature (°C.) | Reaction time (h) | Elevation of salt concentration (g/l) | Crystallization temperature (°C.) | Residue at dissolution temperature (%) |
|---|---|---|---|---|---|---|---|---|---|---|
| 1 | 250 | $UO_3$ | 60 | 1:5 | — | 80 | 3.5 | 100 g $Co_3^{2-}$ | (60) | — |
| 2 | 250 | $UO_3$ | 60 | 1:5 | — | 80 | 3.5 | 50 g $NH_4^-$ | 25 | — |
| 3 | 250 | $UO_3$ | 20 | 1:5 | 8.4 | 70 | 4 | — | 25 | 8 ($UO_2$) |
| 4 | 250 | $U_3O_3$ | 60 | 1.10 | 24 | 80 | 12 | — | 25 | — |
| 5 | 125 | $UO_3$ | 200 | 1:8 | — | 80 | 2 | — | — | 100 (AUC) |
| 6 | 250 | $UO_3$ | 100 | 1:5 | — | 75 | 2 | — | — | 100 (AUC) |
| 7 | 250 | $UO_3$ | 170 | 1:10 | 84 | 80 | 12 | — | — | 100 (AUC) |
| 8 | 250 | $U_3O_3$ | 170 | 1:10 | 50 | 80 | 12 | — | — | 100 (AUC) |

AUC = ammonium uranyl carbonate

The table pertains to the treatment of the applicable uranium oxide with both an aqueous ammonium carbonate solution and an aqueous ammonium hydrogen carbonate solution, as well as with a mixture of these two solutions. The ratio of uranium to carbonate ions in the aqueous solution being used is listed in the column headed "medium".

In an exemplary embodiment 1 of the table, the precipitation of the ammonium uranyl carbonate is attained by increasing the salt concentration in the aqueous solution by 100 g of carbonate ions and 50 g of ammonium ions. In exemplary embodiments 2–4, the precipitation of the ammonium uranyl carbonate is brought about by lowering the temperature of the solution to 25° C. In all of the exemplary embodiments, the ammonium uranyl carbonate being formed is filtered out. Exemplary embodiments 5–8 pertain to the digestion of the applicable uranium oxide with the aqueous solution.

In exemplary embodiments 3 and 4 as well as 7 and 8, the solution also has $H_2O_2$ added to it as an oxidation agent for the applicable uranium oxide. This speeds up the conversion of the applicable uranium oxide to ammonium uranyl carbonate.

Advantageously, the method of the invention is employed for producing sinterable $UO_2$ powder from uranium metal, having an enrichment with the fissionable isotope U-235 that is increased by shining in laser light in a magnetic field or an electrical field. This kind of enriched uranium metal can be especially advantageously oxidized into $UO_3$ and, as $UO_3$, can be treated with the aqueous solution without oxidation agents.

The method according to the invention is also highly suitable for recycling sintered scrap, which can occur in the production of sintered compacts and likely includes sintered $UO_2$, but as a rule is annealed to $U_3O_8$ before the treatment with the aqueous solution.

The ammonium uranyl carbonate obtained in the exemplary embodiments of the table is converted into a sinterable $UO_2$ powder by calcining, that is heating in a mixture of water vapor and hydrogen.

In a manner corresponding to the exemplary embodiments of the table, it is also possible to use U/Pu mixed oxide as the starting oxide for obtaining sinterable (U/Pu)$O_2$ mixed oxide powder.

The sinterable $UO_2$ or U/$PuO_2$ powder can be compressed into green compacts. The green compacts are then sintered into sintered compacts for fuel rods.

We claim:

1. A method for producing one of $UO_2$ and $(U/Pu)O_2$ powder, which comprises:
    obtaining a carbonate selected from the group consisting of ammonium uranyl carbonate and ammonium uranyl plutonyl carbonate by treating at least one starting oxide selected from the group consisting of uranium oxide, plutonium oxide and uranium plutonium mixed oxide, with at least one solution selected from the group consisting of aqueous ammonium carbonate solution and aqueous ammonium hydrogen carbonate solution; and
    heating the carbonate for producing an oxide selected from the group consisting of $UO_2$ and $(U/Pu)O_2$.

2. The method according to claim 1, which comprises carrying out the step of heating the carbonate by calcining.

3. The method according to claim 1, which comprises dissolving the starting oxide in a solution, precipitating the carbonate out of the solution, and filtering out the carbonate.

4. The method according to claim 1, which comprises obtaining the carbonate by digestion of the starting oxide with the solution.

5. The method according to claim 1, which comprises increasing an enrichment of uranium metal to U-235 by shining in laser light, and then oxidizing the uranium metal into the starting uranium oxide.

6. The method according to claim 1, which comprises treating sintered scrap as a starting oxide with the carbonate solution.

7. The method according to claim 1, which comprises compressing the oxide powder obtained by heating the carbonate into green compacts, and sintering the green compacts into sintered compacts.

8. The method according to claim 1, which comprises adding an oxidation agent for the starting oxide to the solution.

* * * * *